United States Patent
Fukatani et al.

(10) Patent No.: US 11,824,196 B2
(45) Date of Patent: Nov. 21, 2023

(54) NEGATIVE ELECTRODE SLURRY, NEGATIVE ELECTRODE, AND RECHARGEABLE BATTERY

(71) Applicant: Samsung SDI Co., Ltd., Yongin-si (KR)

(72) Inventors: Tomoyuki Fukatani, Yokohama (JP); Koji Hoshiba, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 125 days.

(21) Appl. No.: 17/450,651

(22) Filed: Oct. 12, 2021

(65) Prior Publication Data

US 2022/0115665 A1    Apr. 14, 2022

(30) Foreign Application Priority Data

Oct. 14, 2020   (JP) .................................. 2020-173108
May 20, 2021   (KR) ........................ 10-2021-0064940

(51) Int. Cl.
| | |
|---|---|
| *H01M 4/62* | (2006.01) |
| *H01M 4/36* | (2006.01) |
| *H01M 4/38* | (2006.01) |
| *H01M 4/587* | (2010.01) |
| *H01M 4/134* | (2010.01) |
| *H01M 4/02* | (2006.01) |

(52) U.S. Cl.
CPC ........... *H01M 4/622* (2013.01); *H01M 4/134* (2013.01); *H01M 4/364* (2013.01); *H01M 4/386* (2013.01); *H01M 4/587* (2013.01); *H01M 4/621* (2013.01); *H01M 2004/027* (2013.01)

(58) Field of Classification Search
CPC ...... H01M 4/622; H01M 4/364; H01M 4/386; H01M 4/587; H01M 2004/027; H01M 2004/134; H01M 2004/621
See application file for complete search history.

(56) References Cited

U.S. PATENT DOCUMENTS

| | | | |
|---|---|---|---|
| 2011/0003207 A1 | 1/2011 | Oh et al. | |
| 2013/0330622 A1* | 12/2013 | Sasaki ................. | H01M 4/1395 252/182.1 |
| 2016/0036055 A1 | 2/2016 | Yamamoto | |
| 2016/0233513 A1 | 8/2016 | Abe et al. | |
| 2017/0040612 A1 | 2/2017 | Komaba et al. | |
| 2017/0214050 A1 | 7/2017 | Kaneda et al. | |
| 2020/0343556 A1 | 10/2020 | Fukatani et al. | |

FOREIGN PATENT DOCUMENTS

| | | | | |
|---|---|---|---|---|
| CN | 103384932 A | * | 11/2013 | .......... H01M 4/0404 |
| CN | 111509231 A | | 8/2020 | |
| CN | 111554937 A | | 8/2020 | |
| EP | 3 736 893 A1 | | 11/2020 | |
| JP | 5279047 B2 | | 9/2013 | |
| JP | 2016-143635 A | | 8/2016 | |
| JP | 6197866 B2 | | 9/2017 | |
| JP | 6412689 B2 | | 10/2018 | |
| JP | 2019-160690 A | | 9/2019 | |
| JP | 6645430 B2 | | 2/2020 | |
| KR | 20140095804 A | * | 8/2014 | |
| KR | 101654448 B1 | * | 9/2016 | |
| WO | WO-2010098380 A1 | * | 9/2010 | .......... H01M 10/052 |
| WO | WO 2015/046304 A1 | | 4/2015 | |
| WO | WO 2015/163302 A1 | | 10/2015 | |

OTHER PUBLICATIONS

Machine Translation of WO-2010098380-A1 (Jun. 21, 2023) (Year: 2023).*
Machine Translation of CN-103384932-A (Jun. 21, 2023) (Year: 2023).*
Machine Translation of KR-20140095804-A (Jun. 21, 2023) (Year: 2023).*
Machine Translation of KR-101654448-B1 (Jun. 21, 2023) (Year: 2023).*
Extended European Search Report dated Feb. 16, 2022, of the corresponding European Patent Application No. 21202540.7, 10pp.

* cited by examiner

*Primary Examiner* — Matthew J Merkling
(74) *Attorney, Agent, or Firm* — Lewis Roca Rothgerber Christie LLP

(57) ABSTRACT

A negative electrode slurry includes a negative active material including a first active material in an amount of greater than or equal to about 5 wt % and less than or equal to about 100 wt %, a binder for binding the negative active material, and a solvent for dispersing the negative active material and the binder in the negative electrode slurry, wherein the first active material contains silicon atoms in an amount of greater than or equal to about 20 wt % and less than or equal to about 100 wt %, the binder includes a particulate dispersed body and a water-soluble polymer containing an acrylic acid-acrylonitrile-based copolymer, and when a sum of an amount of the negative active material and an amount of the binder is 100 wt %, an amount of the water-soluble polymer is greater than or equal to about 0.5 wt % and less than or equal to about 2 wt %.

17 Claims, No Drawings

NEGATIVE ELECTRODE SLURRY, NEGATIVE ELECTRODE, AND RECHARGEABLE BATTERY

CROSS-REFERENCE TO RELATED APPLICATION

This application claims priority to and the benefit of Japanese Patent Application No. 2020-173108 filed in the Japan Patent Office on Oct. 14, 2020, and Korean Patent Application No. 10-2021-0064940 filed in the Korean Intellectual Property Office on May 20, 2021, the entire contents of which are hereby incorporated by reference.

BACKGROUND

1. Field

A negative electrode slurry, a negative electrode formed using the negative electrode slurry, and a rechargeable battery including the negative electrode are disclosed.

2. Description of the Related Art

One method for securing high capacity of non-aqueous electrolyte rechargeable batteries including rechargeable lithium ion batteries is to apply a silicon-containing active material including a larger amount of intercalated lithium than an existing graphite-based active material. However, because the silicon-containing active materials exhibit a large volume change due to intercalation/deintercalation of lithium, a negative electrode mixture layer violently expands and contracts during charge and discharge. As a result, there are problems of decreasing electronic conductivity between negative active material particles, thereby isolating the silicon-containing active material in a mixture layer, blocking a conductive path between the negative active material and a current collector, and the like, thereby deteriorating cycle characteristics of such rechargeable batteries.

Accordingly, in order to suppress or reduce expansion of a negative electrode, a negative electrode slurry including an acrylic acid-based polymer having relatively high hardness as a binder may be used to manufacture the negative electrode.

SUMMARY

When manufacturing a negative electrode using the negative electrode slurry including an acrylic acid-based polymer having relatively high hardness as a binder, for example, when manufacturing a negative electrode having a thickness of greater than or equal to about 3.5 mAh/cm$^2$, cracks may occur in the negative electrode during coating and drying processes of the negative electrode slurry.

Embodiments of the present disclosure may be made in consideration of the above problems and provide a negative electrode slurry for forming a negative electrode that suppresses or reduces expansion of the negative electrode containing silicon atoms and capacity deterioration due to the repetition of the charge/discharge cycle, and is difficult to generate cracks during the coating and drying processes.

A negative electrode slurry according to one or more embodiments includes a negative active material including a first active material in an amount of greater than or equal to about 5 wt % and less than or equal to about 100 wt % (or 99 wt %) based on 100 wt % of the negative active material, a binder for binding the negative active material, and a solvent for dispersing the negative active material and the binder in the negative electrode slurry, wherein the first active material contains silicon atoms in an amount of greater than or equal to about 20 wt % and less than or equal to about 100 wt % based on 100 wt % of the first active material, the binder includes a particulate dispersed body and a water-soluble polymer including a copolymer including an acrylic acid-based monomer and an acrylonitrile-based monomer (hereinafter, also referred to as an acrylic acid-acrylonitrile-based copolymer), and when a sum of an amount of the negative active material and an amount of the binder is 100 wt %, a content of the water-soluble polymer is greater than or equal to about 0.5 wt % and less than or equal to about 2 wt %.

According to the negative electrode slurry configured in this way, because the binder includes a water-soluble polymer containing an acrylic acid-acrylonitrile-based copolymer, expansion of the negative electrode including the silicon-containing active material may be effectively suppressed or reduced.

In addition, because the binder includes not only the water-soluble polymer but also the particulate dispersed body, and an amount of the water-soluble polymer in the binder is greater than or equal to about 0.5 wt % and less than or equal to about 2 wt %, flexibility of the negative electrode mixture layer formed by coating and drying of the negative electrode slurry may be adjusted to a suitable or appropriate range.

As a result, occurrence of cracks in the negative electrode at the time of coating and drying may be suppressed or reduced.

In order to suppress or reduce the expansion of the negative electrode, the acrylic acid-acrylonitrile-based copolymer may include a (meth)acrylic acid-based monomer-derived unit in an amount of greater than or equal to about 40 wt % and less than or equal to about 70 wt % based 100 wt % of the copolymer, and a (meth)acrylonitrile-based monomer-derived unit in an amount of greater than or equal to about 30 wt % and less than or equal to about 60 wt % based 100 wt % of the copolymer.

By applying the copolymer having such a configuration, it is possible to suppress or reduce peeling of the negative electrode mixture layer formed by coating and drying the negative electrode slurry including this copolymer on the negative current collector from the negative current collector, and improve a cycle maintenance rate.

The acrylic acid-acrylonitrile-based copolymer may further include a unit derived from an other monomer copolymerizable with the (meth)acrylic acid-based monomer or the (meth)acrylonitrile-based monomer.

From the viewpoint of reducing the expansion of the negative electrode during charging and the peeling of the negative electrode mixture layer from the negative current collector, it is desirable that the water-soluble polymer includes the acrylic acid-acrylonitrile-based copolymer in an amount of greater than or equal to about 50 wt % based on 100 wt % of the water-soluble polymer.

As an embodiment, for example, the (meth)acrylic acid-based monomer may be at least one type (or kind) selected from (meth)acrylic acid, a metal salt of (meth)acrylic acid, an ammonium salt of (meth)acrylic acid, and an amine salt of (meth)acrylic acid.

From the viewpoint of suppressing or reducing the expansion of the negative electrode during charging and the peeling of the negative electrode mixture layer from the negative current collector, an 8 wt % aqueous solution of the acrylic acid-acrylonitrile-based copolymer may have a viscosity of greater than or equal to about 500 mPa·s at 25° C.

In addition, if the viscosity of the 8 wt % aqueous solution of the acrylic acid-acrylonitrile-based copolymer is less than or equal to about 10000 mPa·s at 25° C., the viscosity of the negative electrode slurry does not become excessively large, and it is not necessary to lower a solid content concentration of the negative electrode slurry so as to adjust the viscosity, and a drying time may be reduced to improve productivity.

From the viewpoint of improving the stability of the negative electrode slurry, the particulate dispersed body may include a polymer having a glass transition temperature of greater than or equal to about −30° C. and less than or equal to about 20° C.

Non-limiting examples of the particulate dispersed body may include a copolymer containing a styrene monomer-derived unit and a butadiene monomer-derived unit.

From the viewpoint of adjusting the negative electrode slurry to a viscosity suitable for coating, the water-soluble polymer may further include a cellulose ether containing a carboxymethyl group and/or a salt of a cellulose ether containing a carboxymethyl group.

From the viewpoint of ease of coating, the negative electrode slurry may have a viscosity at a solid content concentration of greater than or equal to about 45 wt % and less than or equal to about 60 wt %, based on 100 wt % of the negative electrode slurry, of greater than or equal to about 1000 mPa·s and less than or equal to about 5000 mPa·s at 25° C.

The solid content concentration of the negative electrode slurry may be obtained from a ratio of a total mass (a mass as powder for the component added as powder, or a mass as a solid component calculated from the concentration in the aqueous solution for the component added as an aqueous solution) of each component other than the solvent for negative electrode slurry added when preparing the negative electrode slurry to the total mass of the negative electrode slurry.

In an embodiment, the negative active material may further include a graphite-based active material as a second active material.

In addition, the negative electrode slurry may further include a conductive agent.

The negative electrode slurry may suppress or reduce expansion of the electrode by the silicon-containing active material and capacity deterioration of the rechargeable battery due to repeated charge and discharge cycles, and may form a negative electrode that is less prone to cracking during coating and drying processes.

DETAILED DESCRIPTION

Hereinafter, example embodiments will be described in more detail so that those of ordinary skill in the art can easily implement the subject matter of the present disclosure. However, this disclosure may be embodied in many different forms and is not construed as limited to the example embodiments set forth herein.

The terminology used herein is used to describe certain embodiments only, and is not intended to limit the present disclosure. As used herein, the singular expression includes the plural expression unless the context clearly dictates otherwise.

As used herein, "combination thereof" means mixtures, laminates, composites, copolymers, alloys, blends, reaction products, and/or the like of constituents.

Herein, it should be understood that terms such as "comprises," "includes," or "have" are intended to designate the presence of an embodied feature, number, step, element, or a combination thereof, but do not preclude the possibility of the presence or addition of one or more other features, numbers, steps, elements, or a combination thereof.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, the term "layer," as used herein, includes not only a shape formed on the whole surface when viewed from a plan view, but also a shape formed on a partial surface.

Hereinafter, a detailed configuration of a rechargeable battery according to an embodiment will be further described.

1. Non-Aqueous Electrolyte Rechargeable Battery

A rechargeable lithium ion battery according to one or more embodiments includes a positive electrode, a negative electrode, a separator, and a non-aqueous electrolyte. The charging reached voltage (oxidation-reduction potential) of embodiments of the rechargeable lithium ion battery may be greater than or equal to about 4.0 V (vs. Li/Li+) and less than or equal to about 5.0 V, or greater than or equal to about 4.2 V and less than or equal to about 5.0 V. The shape of the rechargeable lithium ion battery is not particularly limited, but it may be for example, cylindrical, prismatic, laminate-type (laminate kind), or button-type (button kind), and the like.

1-1. Positive Electrode

The positive electrode includes a positive current collector and a positive electrode mixture layer formed on the positive current collector. The positive current collector may be any suitable conductor as long as it is an electrical conductor and, may be, for example, plate-shaped or thin-shaped, and suitably or desirably made of aluminum, stainless steel, nickel-coated steel, and/or the like. The positive electrode mixture layer includes a positive active material, and may further include a conductive agent and a positive electrode binder.

The positive active material may be, for example, a transition metal oxide containing lithium and/or solid solution oxide, and is not particularly limited as long as it is a material capable of electrochemically intercalating and deintercalating lithium ions.

Examples of the transition metal oxide containing lithium may include $Li_{1.0}Ni_{0.88}Co_{0.1}Al_{0.01}Mg_{0.01}O_2$, etc. In addition, it may include Li—Co-based composite oxides such as $LiCoO_2$, etc., and/or Li—Ni—Co—Mn-based composite oxide such as $LiNi_xCo_yMn_zO_2$, etc., Li—Ni-based composite oxide, such as $LiNiO_2$, etc., and/or Li—Mn-based composite oxide, such as $LiMn_2O_4$, etc.

Examples of the solid solution oxide may include, $Li_aMn_xCo_yNi_zO_2$ ($1.150 \leq a \leq 1.430$, $0.45 \leq x \leq 0.6$, $0.10 \leq y \leq 0.15$, and $0.20 \leq z \leq 0.28$), $LiMn_{1.5}Ni_{0.5}O_4$, and the like.

On the other hand, the content (e.g., amount or content ratio) of the positive active material is not particularly limited, and any suitable content applicable to the positive electrode mixture layer of the non-aqueous electrolyte rechargeable battery may be sufficient or suitable. Moreover, these compounds may be used independently, or plural types (or kinds) may be mixed and used.

The conductive agent is not particularly limited as long as it is used to increase the conductivity (e.g., electrical conductivity) of the positive electrode. Non-limiting examples of the conductive agent include those containing at least one selected from carbon black, natural graphite, artificial graphite, and fibrous carbon. Examples of the carbon black include furnace black, channel black, thermal black, ketjen black, and acetylene black. Examples of the fibrous carbon include carbon nanotubes, graphene, and carbon nanofibers.

The content of the conductive agent is not particularly limited, and any suitable content applicable to the positive electrode mixture layer of the non-aqueous electrolyte rechargeable battery may be sufficient or suitable.

Examples of the binder for the positive electrode may include a fluorine-containing resin (such as polyvinylidene fluoride), an ethylene-containing resin (such as a styrene-butadiene rubber, and an ethylene-propylene-diene terpolymer), an acrylonitrile-butadiene rubber, a fluororubber, polyvinyl acetate, polymethylmethacrylate, polyethylene, polyvinyl alcohol, carboxy methyl cellulose and/or carboxy methyl cellulose derivatives (such as a salt of carboxymethyl cellulose), and/or nitrocellulose.

The binder for the positive electrode may be any suitable binder capable of binding the positive active material and the conductive agent on the positive current collector, and is not particularly limited.

1-2. Negative Electrode

The negative electrode includes a negative current collector and a negative electrode mixture layer formed on the negative current collector. The negative current collector may be any suitable conductor as long as it is an electrical conductor, for example, a plate-shaped or thin-shaped one, and may be suitably or desirably composed of copper, stainless steel, nickel-plated steel, and/or the like. The negative electrode mixture layer may include, for example, a negative active material and a negative electrode binder. The configuration of the negative electrode mixture layer is a characteristic part of embodiments of the present disclosure, and will be described in more detail herein below.

1-3. Separator

The separator is not particularly limited, and any suitable separator may be used as long as it is used as a separator of a rechargeable lithium ion battery. The separator may include a porous film and/or a non-woven fabric having excellent high rate discharge performance that may be used alone or together with other materials.

Examples of the resin constituting the separator may include a polyolefin-based resin such as polyethylene and polypropylene; a polyester-based resin such as polyethylene terephthalate and polybutylene terephthalate; polyvinylidene difluoride, a vinylidene difluoride-hexafluoropropylene copolymer, a vinylidene difluoride-perfluorovinylether copolymer, a vinylidene difluoride-tetrafluoroethylene copolymer, a vinylidene difluoride-trifluoroethylene copolymer, a vinylidene difluoride-fluoroethylene copolymer, a vinylidene difluoride-hexafluoroacetone copolymer, a vinylidene difluoride-ethylene copolymer, a vinylidene difluoride-propylene copolymer, a vinylidene difluoride-trifluoro propylene copolymer, a vinylidene difluoride-tetrafluoroethylene copolymer, or a vinylidene difluoride-ethylene-tetrafluoroethylene copolymer.

On the other hand, the porosity of the separator is not particularly limited, and may be any suitable porosity of a separator generally used for a rechargeable lithium ion battery. On the surface of the separator, a heat-resistant layer including inorganic particles for improving heat resistance, or a layer including an adhesive for adhering to the electrode to fix a battery element may be provided.

The inorganic particles may include $Al_2O_3$, $AlO(OH)$, $Mg(OH)_2$, $SiO_2$, and/or the like. Examples of the adhesive may include a vinylidene fluoride-hexafluoropropylene copolymer, an acid-modified product of a vinylidene fluoride polymer, and a styrene-(meth)acrylic acid ester copolymer.

1-4. Non-Aqueous Electrolytic Solution

For the non-aqueous electrolytic solution, any suitable non-aqueous electrolytic solution for a rechargeable lithium ion battery may be used without particular limitation. The non-aqueous electrolytic solution has a composition in which an electrolytic salt is contained in a non-aqueous solvent that is a solvent for an electrolytic solution.

The non-aqueous solvent may include, for example, cyclic carbonate esters such as propylene carbonate, ethylene carbonate, butylene carbonate, chloroethylene carbonate, fluoroethylene carbonate, and/or vinylene carbonate, cyclic esters such as γ-butyrolactone and/or γ-valerolactone, linear carbonates such as dimethyl carbonate, diethyl carbonate, and/or ethylmethyl carbonate, linear esters such as methyl formate, methyl acetate, methyl butyrate, ethyl propionate, and/or propyl propionate, ethers such as tetrahydrofuran and/or a derivative thereof, 1,3-dioxane, 1,4-dioxane, 1,2-dimethane 1,2-dimethoxyethane, 1,4-dibutoxyethane, and/or methyldiglyme, ethylene glycol monopropyl ether, and/or propylene glycol monopropyl ether, nitriles such as acetonitrile and/or benzonitrile, dioxolane and/or a derivative thereof, ethylene sulfide, sulfolane, sultone, and/or a derivative thereof, which may be used alone or in a mixture of two or more. On the other hand, when two or more of the non-aqueous solvents are mixed and used, the mixing ratio of each non-aqueous solvent may be any suitable mixing ratio that is generally used in a rechargeable lithium ion battery.

Examples of the electrolytic salt may include an inorganic ion salt including lithium (Li), sodium (Na), or potassium (K) such as $LiClO_4$, $LiBF_4$, $LiAsF_6$, $LiPF_6$, $LiPF_{6-x}(CnF_{2n+1})_x$ [provided that $1<x<6$, $n=1$ or $2$], LiSCN, LiBr, LiI, $Li_2SO_4$, $Li_2B_{10}Cl_{10}$, $NaClO_4$, NaI, NaSCN, NaBr, $KClO_4$, KSCN, an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfonate, lithium octyl sulfate, or lithium dodecyl benzene sulfonate, and these ionic compounds may be used alone or in a mixture of two or more.

On the other hand, the concentration of the electrolyte salt can be any suitable concentration used in a non-aqueous electrolytic solution generally used in a rechargeable lithium ion battery, without particular limitation. In an embodiment, the non-aqueous electrolytic solution may include the aforementioned lithium compound (electrolytic salt) at a concentration of greater than or equal to about 0.8 mol/L and less than or equal to about 1.5 mol/L.

On the other hand, various suitable additives may be added to the non-aqueous electrolytic solution. Examples of such additives may include an additive that acts for a negative electrode, an additive that acts for a positive electrode, an ester-based additive, a carbonate ester-based additive, a sulfuric acid ester-based additive, a phosphoric acid ester-based additive, a boric acid ester-based additive, an anhydride-based additive, and an electrolyte-based additive. One of these may be added to the non-aqueous electrolyte, or a plurality of types (or kinds) of additives may be added to the non-aqueous electrolyte.

2. Manufacturing Method of Non-Aqueous Electrolyte Rechargeable Battery

The manufacturing method of a rechargeable lithium ion battery is described.

The positive electrode may be manufactured as follows. First, a mixture of a positive active material, a conductive agent, and a binder for the positive electrode in a suitable or desired ratio is dispersed in solvent (e.g., N-methyl-2-pyrrolidone) for a positive electrode slurry to form a positive electrode slurry. Subsequently, this positive electrode slurry is coated on the positive current collector and dried to form a positive electrode mixture layer.

In addition, the coating method is not specifically limited. The coating method may be, for example, a knife coater method, a gravure coater method, a reverse roll coater method, and/or a slit die coater method. Each of the coating methods may be also performed by the same (or substantially the same) method. Next, the positive electrode material mixture layer may be pressed to a suitable or desired density by a press machine. Thereby, a positive electrode is manufactured.

The negative electrode may be also manufactured in the same (or substantially the same) way as the positive electrode. First, a negative electrode slurry is prepared by dispersing a mixture of materials constituting the negative electrode mixture layer in a solvent for negative electrode slurry (e.g., an aqueous solvent such as water). Then, the negative electrode slurry is applied onto the negative current collector and dried to form a negative electrode mixture layer. Subsequently, the negative electrode mixture layer is pressed to a suitable or desired density with a press machine. Accordingly, a negative electrode is manufactured.

Subsequently, an electrode structure is produced by sandwiching a separator between the positive electrode and the negative electrode. Then, the electrode structure is processed into a suitable or desired shape (e.g., cylindrical, prismatic, laminated, buttoned, etc.), and inserted into a container of the above shape. Then, by injecting the non-aqueous electrolytic solution into the container, the electrolyte is impregnated into the pores in the separator and the voids of the positive electrode and the negative electrode. Accordingly, a rechargeable lithium ion battery is manufactured.

3. Characteristics of Binder Composition

Hereinafter, the negative electrode mixture layer according to an embodiment and the negative electrode slurry used to form the negative electrode mixture layer will be described in more detail.

3-1. Negative Electrode Slurry

As described above, the negative electrode slurry includes a negative active material and a negative electrode binder. The negative electrode slurry further includes a solvent for negative electrode slurry in which the negative active material and the negative electrode binder are dispersed.

The negative active material includes, for example, a Si-based active material that is a silicon-containing active material containing silicon atoms (which may also be referred to as a first active material) and, optionally, a graphite-based active material containing graphite (also referred to as a second active material).

Non-limiting examples of the Si-based active material may include, for example, at least one active material selected from a mixture (e.g., a silicon-carbon composite active material) in which particulates of silicon (Si) and/or silicon oxide ($SiO_x$ ($0<x\leq2$)) and graphitic carbon and/or amorphous carbon are combined, silicon particulates, silicon-based alloys, and/or the like.

Non-limiting examples of the graphite-based active material may include, for example, at least one active material selected from cokes such as coal-based, petroleum-based pure coke, calcined coke, and needle coke, artificial graphite obtained by graphitizing graphite precursors such as mesophase carbons such as mesophase spherules and/or bulk mesophase at about 1500° C. or higher, or for example about 2800° C. to about 3200° C., natural graphite in the form of scales, lumps and/or granulated spheroids, a mixture of artificial graphite and natural graphite, natural graphite coated with artificial graphite, and/or the like.

These may be subjected to chemical and/or physical treatment, and treatment methods may include pulverization, classification, granulation, lamination, compression, compounding, mixing, coating, oxidation, vapor deposition, mechanochemical treatment, angle-removal, spheroidization, curvature, heat treatment, etc.

In the case of artificial graphite, either before or after a graphitization treatment may be possible, any of the above-described treatments may be performed on the artificial graphite either alone or in combination. Non-limiting examples of the artificial graphite may include, but are not limited to, MCMB, MCF, and MAG.

From the viewpoint of sufficiently or suitably increasing the charge/discharge capacity of the negative electrode mixture layer, a content ratio (e.g., amount ratio) of the graphite-based active material and the Si-based active material may be adjusted, for example, so that a capacity ratio of the specific capacity (unit:mAh/g) of the Si-based active material may be 3.5 times or more relative to the specific capacity (unit:mAh/g) of the graphite-based active material.

In order to realize such a capacity ratio, the Si-based active material contains silicon atoms in an amount of greater than or equal to about 20 wt % and less than or equal to about 100 wt % (or 99 wt %) based on 100 wt % of the Si-based active material, and the content (e.g., amount) of the Si-based active material in the negative active material may be greater than or equal to about 5 wt % and less than or equal to about 100 wt % (or 99 wt %) based on the total amount of the negative active material.

The negative active material may further include, in addition to the above, for example, at least one negative active material selected from a Sn-based active material (e.g., a mixture of tin (Sn) and/or tin oxide particles and a graphite-based active material, tin particles, and/or an alloy based on tin), metal lithium and titanium oxide compounds such as $Li_4Ti_5O_2$, lithium nitride, and/or the like.

The negative electrode binder may be a binder for binding the negative active materials and the negative electrode mixture layer to the negative current collector, and contains a particulate dispersed body and a water-soluble polymer.

The particulate dispersed body may be particulates that may be uniformly or substantially uniformly dispersed in an aqueous solvent such as water, which may be the solvent for negative electrode slurry, and may be particulates of a hydrophobic polymer having a glass transition temperature of greater than or equal to about −50° C., or more suitably or desirably greater than or equal to about −30° C. The hydrophobic polymer may include, for example, a styrene monomer-derived unit and/or a butadiene monomer-derived unit.

Non-limiting examples of the hydrophobic polymer may include, for example, a styrene-butadiene copolymer, a modified styrene-butadiene copolymer obtained by vulcanizing a styrene-butadiene copolymer, a styrene acrylic acid ester copolymer, a polyolefin-based polymer, and a polyvinylidene fluoride-based polymer.

The hydrophobic polymer may be a synthetic rubber having a glass transition temperature of less than or equal to room temperature (e.g., less than or equal to about 20° C.). The glass transition temperature may be measured by increasing the temperature from −40° C. to 200° C. at a rate of 10° C./min using a Thermo-mechanical Analyzer (manufactured by TA).

In one or more embodiments, the aqueous solvent may be, for example, a mixture of water and an organic solvent miscible with water, in addition to the above-mentioned water, and the water content may be greater than or equal to about 50 wt % based on 100 wt % of the mixture. Examples of the organic solvent miscible with water include water-soluble alcohols.

An average particle diameter of the particulate dispersed body may be greater than or equal to about 10 nm and less than or equal to 500 nm, greater than or equal to about 30 nm and less than or equal to 400 nm, or greater than or equal to about 50 nm and less than or equal to 300 nm. The average particle diameter may be measured by a laser diffraction method using a commercially available laser diffraction particle size measuring apparatus (for example, MT 3000 of Microtrac).

The water-soluble polymer may include an acrylic acid-acrylonitrile-based copolymer. The acrylic acid-acrylonitrile-based copolymer may include a (meth)acrylic acid-based monomer-derived unit and/or a (meth)acrylonitrile-based monomer-derived unit. In the acrylic acid-acrylonitrile-based copolymer, a content (e.g., an amount) of the (meth)acrylic acid-based monomer-derived unit may be greater than or equal to about 40 wt % and less than or equal to about 70 wt % based on 100 wt % of the acrylic acid-acrylonitrile-based copolymer, and a content (e.g., an amount) of the (meth)acrylonitrile-based monomer-derived unit may be greater than or equal to about 30 wt % and less than or equal to about 60 wt % based on 100 wt % of the acrylic acid-acrylonitrile-based copolymer.

In addition, the acrylic acid-acrylonitrile-based copolymer may further include a unit derived from an other monomer copolymerizable with the (meth)acrylic acid-based monomer and/or the (meth)acrylonitrile monomer, and a content (e.g., an amount) of the unit derived from the other monomer may be in the range of greater than about 0 wt % and less than or equal to about 20 wt % based on 100 wt % of the acrylic acid-acrylonitrile-based copolymer.

In the acrylic acid-acrylonitrile-based copolymer, if the content (or amount) of the (meth)acrylic acid-based monomer-derived unit is greater than or equal to about 40 wt % based on 100 wt % of the acrylic acid-acrylonitrile-based copolymer, the acrylic acid-acrylonitrile-based copolymer may be easily soluble in water, and may further improve dispersibility of the negative active material and storage stability of the negative electrode slurry.

In addition, if the content (or amount) of the structural unit derived from the (meth)acrylic acid monomer of the acrylic acid-acrylonitrile-based copolymer is less than or equal to about 70 wt % based on 100 wt % of the acrylic acid-acrylonitrile-based copolymer, occurrence of cracks in the coating and drying process of the negative electrode slurry may be further suppressed or reduced.

If the content (or amount) of the structural unit derived from the (meth)acrylonitrile monomer in the acrylic acid-acrylonitrile-based copolymer is greater than or equal to about 30 wt % based on 100 wt % of the acrylic acid-acrylonitrile-based copolymer, a close-contacting property (e.g., adherence) of the negative electrode mixture layer to the negative current collector may be further improved.

In addition, when the content (or amount) of the structural unit derived from the (meth)acrylonitrile monomer in the acrylic acid-acrylonitrile-based copolymer is less than or equal to about 60 wt % based on 100 wt % of the acrylic acid-acrylonitrile-based copolymer, the acrylic acid-acrylonitrile-based copolymer may be easily soluble in water, and dispersibility of the negative active material and storage stability of the negative electrode slurry may be further improved.

In the acrylic acid-acrylonitrile-based copolymer, if the content (or amount) of the structural units derived from the other monomers copolymerizable with the (meth)acrylic acid-based monomer and the (meth)acrylonitrile monomer is less than or equal to about 20 wt % based on 100 wt % of the acrylic acid-acrylonitrile-based copolymer, occurrence of cracks in the coating and/or drying processes of the negative electrode slurry and/or peeling of the negative electrode mixture layer from the negative current collector during charging may be suppressed or reduced.

The (meth)acrylic acid monomer may include at least one selected from (meth)acrylic acid, a metal salt of (meth)acrylic acid, an ammonium salt of (meth)acrylic acid, and an amine salt of (meth)acrylic acid.

The metal salt of (meth)acrylic acid may be, for example, an alkali metal salt of acrylic acid. Examples of the metal salt of acrylic acid may include sodium acrylate, lithium acrylate, potassium acrylate, calcium acrylate, magnesium acrylate, sodium methacrylate, lithium methacrylate, potassium methacrylate, and calcium methacrylate. Among these, sodium acrylate may be suitable or desirable.

Examples of the ammonium salt of (meth)acrylic acid may include an ammonia neutralized product, a monoethanolamine neutralized product, a diethanolamine neutralized product, and a hydroxylamine neutralized product of (meth)acrylic acid. Among these, the ammonia-neutralized product of acrylic acid may be suitable or desirable.

The other monomer copolymerizable with the (meth)acrylic acid monomer and the (meth)acrylonitrile monomer in the acrylic acid-acrylonitrile copolymer may be, for example, a water-soluble monomer. Non-limiting examples of the water-soluble monomer may include (meth)acrylamide, N-(2-hydroxyethyl)acrylamide, N-(2-hydroxyethyl) methacrylamide, 2-hydroxyethyl (meth)acrylate, vinyl pyrrolidone, vinyl acetamide, vinyl formamide, vinyl alcohol, and the like.

An 8 wt % aqueous solution of the acrylic acid-acrylonitrile-based copolymer may have a viscosity at 25° C. of greater than or equal to about 500 mPa·s and less than or equal to about 10000 mPa·s.

When the viscosity of the aqueous solution of the acrylic acid-acrylonitrile-based copolymer is greater than or equal to about 500 mPa·s, a close-contacting property (e.g., adherence) of the negative electrode mixture layer to the negative current collector may be improved.

In addition, when the viscosity of the aqueous solution of the acrylic acid-acrylonitrile-based copolymer is less than or equal to about 10000 mPa·s, excessive viscosity is not imparted to the negative electrode slurry for forming the negative electrode mixture layer, so that the slurry may be coated in a high solid content state and the negative electrode slurry may be efficiently dried to obtain a negative electrode.

The preparing method for making the viscosity of the aqueous solution of the acrylic acid-acrylonitrile-based copolymer fall within the above range is not particularly limited, but, for example, when synthesizing the acrylic acid-acrylonitrile-based copolymer, a divinyl-based monomer as another monomer other than the above may be copolymerized to increase the viscosity of the aqueous solution of the acrylic acid-acrylonitrile-based copolymer.

Examples of the divinyl monomer may include N,N'-methylenebis acrylamide, ethylene glycol dimethacrylate, N,N'-ethylenebis[2-(vinylsulfonyl)acetamide], N,N'-trimethylene bis[2-(vinylsulfonyl)acetamide], and the like.

The water-soluble polymer may further include a water-soluble polymer compound other than the acrylic acid-acrylonitrile-based copolymer. The water-soluble polymer compound may include, for example, a cellulose ether containing a carboxymethyl group and/or a salt thereof. Non-limiting examples of such a water-soluble polymer compound may include an alkali metal salt of carboxymethyl cellulose.

The content (or amount) of the acrylic acid-acrylonitrile-based copolymer in the water-soluble polymer may be greater than or equal to about 50 wt % based on 100 wt % of the water-soluble polymer, or greater than or equal to about 70 wt %, from the viewpoint of reducing the expansion of the negative electrode by the Si-based active material and/or reducing the peeling of the negative electrode mixture layer from the negative electrode current collector.

The content (or amount) of the negative electrode binder may be about 2.5 wt % to about 4.5 wt % when the total mass of the negative active material and the negative electrode binder is 100 wt %.

If the content (or amount) of the negative electrode binder is greater than or equal to about 2.5 wt %, the negative electrode mixture layer may be suppressed or reduced from cracking and/or peeling when the negative electrode mixture layer is coated, dried, and rolled (pressed). In addition, if the content of the negative electrode binder is less than or equal to about 4.5 wt %, excessively large electrode resistance may be suppressed or reduced and a negative electrode having good cycle performance may be obtained.

When the total mass of the negative active material and the negative electrode binder is 100 wt %, the content (or amount) of the water-soluble polymer may be in the range of greater than or equal to about 0.5 wt % and less than or equal to about 2 wt %. When the content (or amount) of the water-soluble polymer is greater than or equal to about 0.5 wt %, the expansion of the negative electrode by the Si-based active material may be sufficiently or suitably suppressed or reduced. In addition, when the content (or amount) of the water-soluble polymer is less than or equal to about 2 wt %, it is difficult to generate cracks in the negative electrode mixture layer when the negative electrode slurry is coated, dried, and rolled.

The viscosity at a solid content concentration of greater than or equal to about 45 wt % and less than or equal to about 60 wt % of the negative electrode slurry at 25° C. may be greater than or equal to about 1000 mPa·s and less than or equal to about 5000 mPa·s, or for example greater than or equal to about 1500 mPa·s and less than or equal to about 4500 mPa·s. The viscosity of the negative electrode slurry may be adjusted by, for example, the added amount of the water-soluble polymer compound.

3-2. Negative Electrode Mixture Layer

As described above, the negative electrode mixture layer is formed by coating the negative electrode slurry to one or both surfaces on the negative current collector, and then drying and pressing the same.

In the drying process, the solvent for negative electrode slurry is volatilized, and solid components such as the negative active material and the negative electrode binder dispersed in the negative electrode slurry remain on the negative current collector to form the negative electrode mixture layer. The content ratio (or amount ratio) of each component in the negative electrode mixture layer reflects the content ratio (or amount ratio) of the solid component in the negative electrode slurry as it is.

The negative electrode mixture layer may have an area capacity of greater than or equal to about 3.5 mAh/cm$^2$ and less than or equal to about 10 mAh/cm$^2$ after pressing.

When forming such a negative electrode mixture layer, the aforementioned negative electrode slurry may be coated, for example, at a coating amount of greater than or equal to about 5 mg/cm$^2$ and less than or equal to about 25 mg/cm$^2$, or for example greater than or equal to about 10 mg/cm$^2$ and less than or equal to about 20 mg/cm$^2$ as an areal density of a single surface. In addition, the thickness of the negative electrode mixture layer after drying and pressing may be a thickness of one surface, for example, greater than or equal to about 50 µm and less than or equal to about 150 µm. The charge/discharge capacity of the rechargeable lithium ion battery may be increased by making the coating amount and thickness of the negative electrode mixture layer into these ranges.

On the other hand, the negative electrode mixture layer may further include a conductive agent. As the conductive agent, for example, those disclosed as examples for the positive electrode may be used.

4. Effects According to an Embodiment

According to the negative electrode slurry configured as described above, the negative electrode mixture layer and the negative electrode formed by the negative electrode slurry, the following effects may be obtained.

Because the binder includes a particulate dispersed body and a water-soluble polymer containing an acrylic acid-acrylonitrile-based copolymer, and the content (or amount) of the water-soluble polymer is greater than or equal to about 0.5 wt % and less than or equal to about 2 wt % based on 100 wt % of the total mass of the negative active material and the binder, even if the negative active material contains silicon atoms, expansion of the negative electrode may be sufficiently or suitably suppressed or reduced, and at the same (or substantially the same) time, the occurrence of cracks during coating and drying of the negative electrode slurry may be suppressed or reduced.

As described with respect to one or more embodiments, when the negative electrode mixture layer having an area capacity of greater about 3.5 mAh/cm$^2$ is formed or when a cylindrical battery is formed, the aforementioned effect is particularly remarkably exhibited.

Hereinafter, the subject matter of the present disclosure will be described in more detail with reference to certain examples. However, the following examples are merely example embodiments of the present disclosure, and the present disclosure is not limited to the following examples.

In the present example, acrylic acid-acrylonitrile-based copolymers A to E were first synthesized. Subsequently, these acrylic acid-acrylonitrile-based copolymers A to E were used to prepare negative electrode slurries, and the negative electrode slurries were used to manufacture rechargeable battery cells according to Examples 1 to 14 and Comparative Examples 1 to 8, evaluating the rechargeable battery cells. Hereinafter, each example and comparative example was illustrated.

Synthesis of Acrylic Acid-Acrylonitrile-Based Copolymer

First, acrylic acid-acrylonitrile-based copolymers A to E having each composition shown in Table 1 were synthesized.

TABLE 1

| | Monomer ratio (wt % in AA-AN-based copolymer) | | | Viscosity |
| --- | --- | --- | --- | --- |
| | AA | AN | other monomer | (mPa · s) |
| AA-AN based copolymer A | 60 | 40 | 0 | 2160 |
| AA-AN based copolymer B | 50 | 50 | 0 | 2020 |
| AA-AN based copolymer C | 80 | 20 | 0 | 1840 |
| AA-AN based copolymer D | 30 | 70 | 0 | 1520 |
| AA-AN based copolymer E | 60 | 40 | 0 | 250 |

In Table 1, AA represents acrylic acid, and AN represents acrylonitrile. In addition, a monomer implant ratio shown in Table 1 is reflected as it is in a content ratio (or amount ratio) of each monomer-derived unit in each acrylic acid-acrylonitrile-based copolymer after the synthesis.

Example synthesis sequences of the acrylic acid-acrylonitrile-based copolymers A to E are as follows.

Synthesis of Acrylic Acid-Acrylonitrile-Based Copolymer A

In a 2000 ml detachable flask equipped with a mechanical stirrer, a stirring bar, and a thermometer, 114.0 g of acrylic acid, 76.0 g of acrylonitrile, 158.2 ml of a 4 mol/L sodium hydroxide aqueous solution, 107.77 g of 10 wt % aqueous ammonia, and 705.5 g of ion exchange water were added and then, stirred at 400 rpm, and after internally substituting the system with nitrogen and setting a jacket temperature at 85° C., a temperature thereof was increased. When the system temperature reached 60° C., an initiator aqueous solution prepared by dissolving 2608 mg of 2,2'-azobis(2-methyl-N-2-hydroxyethyl propionamide) in 26.0 g of ion exchange water was added thereto. At the jacket temperature of 85° C., the above initiator was added thereto and then, continuously stirred for 12 hours, obtaining a light yellow polymer aqueous solution. After the reaction, the aqueous solution was measured with respect to non-volatile components, and the result was determined to be 16.0 wt %.

Subsequently, the reaction solution was concentrated through heating and distillation under a reduced pressure to remove unreacted monomers, ammonia water and ion exchange water were added thereto to adjust a concentration and pH of the polymer aqueous solution, thereby obtaining an acrylic acid-acrylonitrile-based copolymer A aqueous solution including 8 wt % of the polymer and having pH 7.5 (when measured at 25° C. and 30 rpm by a B type viscosity meter, viscosity of the 8 wt % polymer aqueous solution=2160 mPa·s). On the other hand, the concentration of the polymer aqueous solution was calculated from a mass of non-volatile components in a state excluding unreacted monomers.

Synthesis of Acrylic Acid-Acrylonitrile-Based Copolymer B

In a 2000 ml detachable flask equipped with a mechanical stirrer, a stir bar, and a thermometer, 80.0 g of acrylic acid, 80.0 g of acrylonitrile, 222.0 ml of a 4 mol/L sodium hydroxide aqueous solution, and 592.0 g of ion exchange water were added and then, stirred at 400 rpm, and after internally substituting the system with nitrogen and setting a jacket temperature at 85° C., the temperature was increased.

When the system temperature reached 60° C., an initiator aqueous solution prepared by dissolving 2642 mg of 2,2'-azobis(2-methyl-N-2-hydroxyethylpropionamide) in 26.0 g of ion exchange water was added thereto. At the jacket temperature of 85° C., the obtained mixture was continuously stirred for 12 hours after the addition of the above initiator, obtaining a light yellow polymer aqueous solution. After the reaction, the aqueous solution was measured with respect to non-volatile components, and the result was determined to be 16.1 wt %.

Subsequently, the reaction solution was concentrated through heating and distillation under a reduced pressure to remove unreacted monomers, ammonia water and ion exchange water were added thereto to adjust a concentration and pH of the polymer aqueous solution, thereby obtaining an acrylic acid-acrylonitrile-based copolymer B aqueous solution including 8 wt % of the polymer and having pH 7.5 (when measured at 25° C. and 30 rpm by the B type viscosity meter, viscosity of the 8 wt % polymer aqueous solution=2020 mPa·s).

Synthesis of Acrylic Acid-Acrylonitrile-Based Copolymer C

In a 2000 ml detachable flask equipped with a mechanical stirrer, a stirring bar, and a thermometer, 128.0 g of acrylic acid, 32.0 g of acrylonitrile, 177.6 ml of a 4 mol/L sodium hydroxide aqueous solution, 121.0 g of 10 wt % aqueous ammonia, and 541.4 g of ion exchange water were added and then, stirred at 400 rpm, and after internally substituting the system with nitrogen and setting a jacket temperature at 85° C., a temperature thereof was increased. When the system temperature reached 60° C., an initiator aqueous solution prepared by dissolving 2744 mg of 2,2'-azobis(2-methyl-N-2-hydroxyethyl propionamide) in 26.0 g of ion exchange water was added thereto. At the jacket temperature of 85° C., the obtained mixture was continuously stirred for 12 hours after the addition of the above initiator, obtaining a yellow polymer aqueous solution. After the reaction, the aqueous solution was measured with respect to non-volatile components, and the result was determined to be 16.5 wt %.

Subsequently, the reaction solution was concentrated through heating and distillation under a reduced pressure to remove unreacted monomers, ammonia water and ion exchange water were added thereto to adjust a concentration and pH of the polymer aqueous solution, thereby obtaining an acrylic acid-acrylonitrile-based copolymer C aqueous solution including 8 wt % of a polymer and having pH 7.5 (when measured at 25° C. and 30 rpm by the B type viscosity meter, viscosity of the 8 wt % polymer aqueous solution=1840 mPa·s).

Synthesis of Acrylic Acid-Acrylonitrile-Based Copolymer D

In a 2000 ml detachable flask equipped with a mechanical stirrer, a stirring bar, and a thermometer, 48.0 g of acrylic acid, 112.0 g of acrylonitrile, 133.2 ml of a 4 mol/L sodium hydroxide aqueous solution, and 670.8 g of ion exchange water were added and then, stirred at 400 rpm, and after internally substituting the system with nitrogen and setting a jacket temperature at 85° C., a temperature thereof was increased. When the system temperature reached 60° C., an initiator aqueous solution prepared by dissolving 3600 mg of 2,2'-azobis(2-methyl-N-2-hydroxyethyl propionamide) in 36.0 g of ion exchange water was added thereto. At the jacket temperature of 85° C., the obtained mixture was continuously stirred for 12 hours after the addition of the above initiator, obtaining a yellow polymer suspension. After the reaction, the suspension was measured with respect to non-volatile components, and the result was determined to be 15.5 wt %.

Subsequently, the reaction solution was concentrated through heating and distillation under a reduced pressure to remove non-reaction monomers, ammonia water and ion exchange water were added thereto to adjust a concentration and pH of the polymer suspension, thereby obtaining an acrylic acid-acrylonitrile-based copolymer D aqueous suspension including 8 wt % of the polymer and having pH 7.5 (when measured at 25° C. and 30 rpm by a B type viscosity meter, viscosity of the 8 wt % polymer aqueous suspension=1520 mPa·s).

Synthesis of Acrylic Acid-Acrylonitrile-Based Copolymer E

In a 2000 ml detachable flask equipped with a mechanical stirrer, a stirring bar, and a thermometer, 30.0 g of acrylic acid, 20.0 g of acrylonitrile, 27.75 ml of a 4 mol/L sodium hydroxide aqueous solution, 28.36 g of 10 wt % aqueous ammonia, and 883.9 g of ion exchange water were added and then, stirred at 400 rpm, and after internally substituting the system with nitrogen and setting a jacket temperature at 85° C., a temperature thereof was increased. When the system temperature reached 60° C., an initiator aqueous solution prepared by dissolving 944 mg of 2,2'-azobis(2-methyl-N-2-hydroxyethyl propionamide) in 10.0 g of ion exchange water was added thereto. At the jacket temperature of 85° C., the obtained mixture was continuously stirred for 12 hours after the addition of the above initiator, obtaining a yellow polymer aqueous solution. After the reaction, the aqueous solution was measured with respect to non-volatile components, and the result was determined to be 4.9 wt %.

Subsequently, the reaction solution was concentrated through heating and distillation under a reduced pressure to remove non-reaction monomers, ammonia water and ion exchange water were added thereto to adjust a concentration and pH of the polymer aqueous solution, thereby obtaining an acrylic acid-acrylonitrile-based copolymer E aqueous solution including 8 wt % of the polymer and having pH 7.5 (when measured at 25° C. and 30 rpm by the B type viscosity meter, viscosity of the 8 wt % polymer aqueous solution=250 mPa·s).

Example 1

A rechargeable lithium ion battery cell was manufactured as follows.

Manufacture of Negative Electrode 15.0 g of a silicon-carbon composite active material as an Si-based active material, 85.0 g of an artificial graphite active material as a graphite-based active material, 1.042 g of denka black, 14.32 g of the 8.0 wt % acrylic acid-acrylonitrile-based copolymer A aqueous solution, and 41.67 g of an aqueous solution including 1.0 wt % of a sodium salt of carboxylmethyl cellulose (CMC), 35.60 g of ion exchange water were mixed, and then, 3.91 g of 40 wt % aqueous dispersion of a particulate dispersed body (having an average particle diameter of 170 nm) from a modified styrene butadiene copolymer having a glass transition temperature of −15° C. was added thereto, thereby preparing negative electrode slurry.

Subsequently, the negative electrode slurry was coated on both surfaces of a copper foil as a negative current collector by using a reverse roll coater and dried so that a negative electrode mixture layer has 10.3 mg/cm$^2$ (areal density) of a coating amount on each surface. Then, the negative electrode mixture layer was pressed with a roll presser to have a density of 1.65 g/cc, manufacturing a negative electrode with an area capacity of 4.9 mAh/cm$^2$.

Manufacture of Positive Electrode $Li_{1.0}Ni_{0.88}Co_{0.1}Al_{0.01}Mg_{0.01}O_2$, acetylene black, and polyvinylidene fluoride in a mass powder ratio of 97.7:1.0:1.3 were dispersed in N-methyl-2-pyrrolidone, a solvent for positive electrode slurry, thereby preparing a positive electrode slurry.

Subsequently, the slurry was coated and dried on one surface of an aluminum foil as a current collector with a reverse roll coater so that a positive electrode mixture layer has a coating amount of 24.0 mg/cm$^2$ (areal density) and then, pressed with a roll presser to have a mixture layer density of 3.65 g/cc, manufacturing a positive electrode.

Manufacture of Rechargeable Battery Cell

After welding each nickel and aluminum lead wire to the aforementioned negative and positive electrodes, a polyethylene porous separator was provided to produce an electrode laminate formed by inserting one negative electrode between two positive electrodes. Subsequently, the electrode laminate was stored in an aluminum laminate film with the lead wires pulled outside, and the aluminum laminate film was sealed under a reduced pressure after injecting an electrolyte solution thereinto, thereby manufacturing a rechargeable battery cell before the initial charge.

The electrolyte solution was prepared by dissolving 1.3 M $LiPF_6$ and 1 wt % of vinylene carbonate in a mixed solvent of ethylene carbonate/dimethyl carbonate/fluoroethylene carbonate in a volume ratio of 15/80/5.

Manufacture of Metal Lithium Counter Electrode Cell

A metal lithium counter electrode cell before initial charge was manufactured according to substantially the same procedure as above except that a metal lithium-bonded copper foil was used instead of the cross-section positive electrode.

Example 2

A rechargeable battery cell and a metal lithium counter electrode cell were manufactured according to substantially the same procedure as Example 1 except that the acrylic acid-acrylonitrile-based copolymer B was used instead of the acrylic acid-acrylonitrile-based copolymer A in the process of manufacturing the negative electrode of Example 1.

Example 3

A rechargeable battery cell and a metal lithium counter electrode cell were manufactured according to substantially the same procedure as Example 1 except that the particulate dispersed body b (an average particle diameter of 180 nm) obtained from a modified styrene butadiene copolymer having a glass transition temperature 9° C. was used instead of the particulate dispersed body a in the process of manufacturing the negative electrode of Example 1.

Example 4

A rechargeable battery cell and a metal lithium counter electrode cell were manufactured according to substantially the same procedure as Example 1 except that the acrylic acid-acrylonitrile-based copolymer B was used instead of the acrylic acid-acrylonitrile-based copolymer A and the particulate dispersed body b was used instead of the particulate dispersed body a in the process of manufacturing the negative electrode of Example 1.

Example 5

In the process of manufacturing the negative electrode of Example 5, 15.0 g of a silicon-carbon composite active material, 85.0 g of an artificial graphite active material, 1.042 g of denka black, 26.04 g of an aqueous solution including 8.0 wt % of the acrylic acid-acrylonitrile-based copolymer A, and 49.92 g of ion exchange water were mixed, and 2.60 g of aqueous dispersion of 40 wt % of particulate dispersed body a was added thereto, thereby preparing a negative electrode slurry. The negative electrode slurry was used to manufacture a rechargeable battery cell and a metal lithium counter electrode cell according to substantially the same procedure as Example 1.

Example 6

A rechargeable battery cell and a metal lithium counter electrode cell were manufactured according to substantially the same procedure as Example 5 except that the acrylic acid-acrylonitrile-based copolymer B was used instead of the acrylic acid-acrylonitrile-based copolymer A in the process of manufacturing the negative electrode of Example 5.

Example 7

A rechargeable battery cell and a metal lithium counter electrode cell were manufactured according to substantially the same procedure as Example 5 except that the particulate dispersed body b was used instead of the particulate dispersed body a in the process of manufacturing the negative electrode of Example 5.

Example 8

A rechargeable battery cell and a metal lithium counter electrode cell were manufactured according to substantially the same procedure as Example 5 except that the acrylic acid-acrylonitrile-based copolymer B was used instead of the acrylic acid-acrylonitrile-based copolymer A, and the particulate dispersed body b was used instead of the particulate dispersed body a in the process of manufacturing the negative electrode of Example 5.

Comparative Example 1

In the process of manufacturing the negative electrode of Example 1, 15.0 g of a silicon-carbon composite active material, 85.0 g of an artificial graphite active material, 1.042 g of denka black, 62.5 g of an aqueous solution including 5 wt % of sodium salt of poly acrylic acid, and 40.71 g of ion exchange water were mixed, thereby preparing a negative electrode slurry. The negative electrode slurry was coated and dried on a copper foil in substantially the same procedure as Example 1, but a negative electrode mixture layer formed thereof was cracked during the coating and drying, and thus, failed in manufacturing a rechargeable battery cell and a metal lithium counter electrode cell.

Comparative Example 2

In the process of manufacturing the negative electrode of Example 1, 15.0 g of a silicon-carbon composite active material, 85.0 g of an artificial graphite active material, 1.042 g of denka black, 39.06 g of an aqueous solution 8.0 wt % of the acrylic acid-acrylonitrile-based copolymer A, and 52.80 g of ion exchange water were mixed, thereby preparing a negative electrode slurry. The negative electrode slurry was coated and dried on a copper foil in substantially the same procedure as Example 1, but a negative electrode mixture layer formed thereof was cracked during the coating and drying, and thus, failed in manufacturing a rechargeable battery cell and a metal lithium counter electrode cell.

Comparative Example 3

In the process of manufacturing the negative electrode of Example 1, 15.0 g of a silicon-carbon composite active material, 85.0 g of an artificial graphite active material, 1.042 g of denka black, 39.06 g of an aqueous solution including 8.0 wt % of the acrylic acid-acrylonitrile-based copolymer B, and 52.80 g of ion exchange water were mixed, thereby preparing a negative electrode slurry. The negative electrode slurry was coated and dried on a copper foil in substantially the same procedure as Example 1, but a negative electrode mixture layer formed thereof was cracked during the coating and drying, and thus, failed in manufacturing a rechargeable battery cell and a metal lithium counter electrode cell.

Comparative Example 4

In the process of manufacturing the negative electrode of Example 1, 15.0 g of a silicon-carbon composite active material, 85.0 g of an artificial graphite active material, 1.042 g of denka black, 19.53 g of an aqueous solution including 8.0 wt % of the acrylic acid-acrylonitrile-based copolymer A, 104.17 g of an aqueous solution including 1.5 wt % of carboxylmethyl cellulose (CMC), and 6.74 g of ion exchange water were mixed, thereby preparing a negative electrode slurry. The negative electrode slurry was coated and dried on a copper foil in substantially the same procedure as Example 1, but a negative electrode mixture layer formed thereof was cracked during the coating and drying, and thus, failed in manufacturing a rechargeable battery cell and a metal lithium counter electrode cell.

Comparative Example 5

In the process of manufacturing the negative electrode of Example 1, 15.0 g of a silicon-carbon composite active material, 85.0 g of an artificial graphite active material, 1.042 g of denka black, 19.53 g of an aqueous solution including 8.0 wt % of the acrylic acid-acrylonitrile-based copolymer B, 104.17 g of an aqueous solution including 1.5 wt % of carboxylmethyl cellulose (CMC), and 6.74 g of ion exchange water were mixed, thereby preparing a negative electrode slurry. The negative electrode slurry was coated and dried on a copper foil in substantially the same procedure as Example 1, but a negative electrode mixture layer formed thereof was cracked during the coating and drying, and thus, failed in manufacturing a rechargeable battery cell and a metal lithium counter electrode cell.

Comparative Example 6

In the process of manufacturing the negative electrode of Example 1, 15.0 g of a silicon-carbon composite active material, 85.0 g of an artificial graphite active material, 1.042 g of denka black, 104.17 g of an aqueous solution including 1.5 wt % of carboxylmethyl cellulose (CMC), and 49.92 g of ion exchange water were mixed, and 3.91 g of 40 wt % aqueous dispersion of particulate dispersed body a was added thereto, thereby preparing a negative electrode slurry. A rechargeable battery cell and a metal lithium counter electrode cell were manufactured according to substantially the same procedure as Example 1 except that the composition of the negative electrode slurry was changed.

Comparative Example 7

In the process of manufacturing the negative electrode of Example 1, 15.0 g of a silicon-carbon composite active material, 85.0 g of an artificial graphite active material, 1.042 g of denka black, 104.16 g of an aqueous solution including 1.5 wt % of carboxylmethyl cellulose (CMC), and 49.92 g of ion exchange water were mixed, and 3.91 g of 40 wt % aqueous dispersion of the particulate dispersed body b was added thereto, thereby preparing a negative electrode slurry. A rechargeable battery cell and a metal lithium counter electrode cell were manufactured according to substantially the same procedure as Example 1 except that the composition of the negative electrode slurry was changed.

Comparative Example 8

In the process of manufacturing the negative electrode of Example 1, 15.0 g of a silicon-carbon composite active material, 85.0 g of an artificial graphite active material, 1.042 g of denka black, 22.92 g of an aqueous solution including 5 wt % of sodium salt of poly acrylic acid, 41.67 g of an aqueous solution including 1.0 wt % of carboxylmethyl cellulose (CMC), and 52.09 g of ion exchange water were mixed, and 3.91 g of 40 wt % aqueous dispersion of the particulate dispersed body a was added thereto, thereby preparing a negative electrode slurry. A rechargeable battery cell and a metal lithium counter electrode cell were manufactured according to substantially the same procedure as Example 1 except that the composition of the negative electrode slurry was changed.

Example 9

A rechargeable battery cell and a metal lithium counter electrode cell were manufactured according to substantially the same procedure as Example 1 except that the acrylic acid-acrylonitrile-based copolymer C was used instead of the acrylic acid-acrylonitrile-based copolymer A in the process of manufacturing the negative electrode of Example 1.

Example 10

A rechargeable battery cell and a metal lithium counter electrode cell were manufactured according to substantially the same procedure as Example 1 except that the acrylic acid-acrylonitrile-based copolymer D was used instead of the acrylic acid-acrylonitrile-based copolymer A in the process of manufacturing the negative electrode of Example 1.

Example 11

In the process of manufacturing the negative electrode of Example 1, 15.0 g of a silicon-carbon composite active material, 85.0 g of an artificial graphite active material, 1.042 g of denka black, 14.32 g of an aqueous solution including 8.0 wt % of the acrylic acid-acrylonitrile-based copolymer E, 41.67 g of an aqueous solution including 5 wt % of sodium salt of poly acrylic acid, 41.67 g of an aqueous solution including 1.0 wt % of carboxylmethyl cellulose (CMC), and 18.66 g of ion exchange water were mixed, and 3.91 g of 40 wt % aqueous dispersion of the particulate dispersed body a was added thereto, thereby preparing a negative electrode slurry. A rechargeable battery cell and a metal lithium counter electrode cell were manufactured according to substantially the same procedure as Example 1 except that the composition of the negative electrode slurry was changed.

Example 12

A rechargeable battery cell and a metal lithium counter electrode cell were manufactured according to substantially the same procedure as Example 1 except that the particulate dispersed body c (having an average particle diameter of 180 nm) made of a modified styrene butadiene copolymer having a glass transition temperature of −35° C. was used instead of the particulate dispersed body a in the process of manufacturing the negative electrode of Example 1.

Example 13

A rechargeable battery cell and a metal lithium counter electrode cell were manufactured according to substantially the same procedure as Example 1 except that the particulate dispersed body d (having an average particle diameter of 180 nm) made of a modified styrene butadiene copolymer having a glass transition temperature of −50° C. was used instead of the particulate dispersed body a in the process of manufacturing the negative electrode of Example 1.

Example 14

A rechargeable battery cell and a metal lithium counter electrode cell were manufactured according to substantially the same procedure as Example 1 except that the amount of the aqueous solution including 8.0 wt % of the acrylic acid-acrylonitrile-based copolymer A was changed to 6.48 g, the amount of the aqueous solution including 1.0 wt % of sodium salt of carboxylmethyl cellulose (CMC) was changed to 51.87 g, and the amount of the 40 wt % aqueous dispersion of the particulate dispersed body a was changed to 4.15 g in the process of manufacturing the negative electrode of Example 1.

Evaluation of Negative Electrode Slurry, Negative Electrode, and Rechargeable Battery Cell Coating Suitability Examples 1 to 14 and Comparative Examples 1 to 8 were evaluated with respect to coating suitability by examining whether cracks occurred in the negative electrode mixture layers in the process of coating and drying the negative electrode slurries on a copper foil. Evaluation criteria are shown below.
◯: No cracks occurred
×: Cracks occurred Viscosity Change Examples 1 to 14 and Comparative Examples 1 to 8 were evaluated with respect to viscosity stability by comparing viscosity of the negative electrode slurries right after the preparation with viscosity thereof after being stored while stirred at 40 rpm for 24 hours at room temperature. The slurry viscosity (unit: mPa·s) was measured by using a B type viscosity meter, while stirred at 25° C. and 30 rpm. Evaluation criteria are shown below.

○: A slurry viscosity change within a range of 50% to 150% from immediately after being prepared to after being stored for 24 hours Δ: A slurry viscosity change of 150% or more from immediately after being prepared to after being stored for 24 hours Close-Contacting Property The negative electrodes according to Examples 1 to 14 and Comparative Examples 1 to 8 were each cut into a rectangle having a width of 25 mm and a length of 100 mm. Subsequently, an active material side of each cut negative electrode was attached onto a stainless steel plate by using a double-sided adhesive tape, preparing a sample for evaluating a close-contacting property (or adhesion) of the active material. Each sample was mounted on a peel tester (EZ-S, SHIMAZU Corp.) and measured with respect to 180° peel strength.

Expansion Rate of Negative Electrode after First Charge

The metal lithium counter electrode cells according to Examples 1 to 14 and Comparative Examples 6 to 8 were constant current-charged to 0.005 V at a design capacity of 0.1 CA (1 CA=a discharge rate for 1 hour) in a 25° C. thermostat and continuously constant voltage-charged at 0.005 V to 0.01 CA. Subsequently, the cells were disassembled to take apart the negative electrodes, and a thickness of each negative electrode was measured utilizing a micrometer and then, compared with that of the negative electrode before the first charge (before injection of an electrolyte solution) to evaluate an expansion rate of the negative electrode. Herein, the expansion rate was calculated by ((negative electrode thickness after charge)−(negative electrode thickness before charge)/(negative electrode thickness before charge))×100.

Peeling of Negative Electrode Mixture Layer after First Charge

In the aforementioned expansion rate evaluation of the negative electrodes after the first charge, the negative electrodes taken out after the first charge were examined with naked eyes and evaluated according to the following criteria.

○: No peeling of a negative electrode mixture layer from a copper foil substrate Δ: Peeling of a portion of a negative electrode mixture layer from a copper foil substrate ×: Peeling of a whole of a negative electrode mixture layer from a copper foil substrate Cycle Characteristics The rechargeable battery cells according to Examples 1 to 4 and Comparative Examples 3 to 5 were constant current-charged to 4.3 V at 0.1 CA in a 25° C. thermostat and continuously constant voltage-charged at 4.3 V to 0.05 CA. Subsequently, the cells were constant current-discharged at 0.1 C A to 2.5 V. In addition, in the 25° C. thermostat, the $1^{st}$ cycle was performed by performing a constant current-charge at 0.2 CA, a constant voltage-charge at 0.05 CA, and a constant current-discharge at 0.2 CA under a charge cut-off voltage of 4.3 V, under a discharge cut-off voltage of 2.5 V to measure initial discharge capacity.

These rechargeable battery cells were tested with respect to cycle-life by performing 100 cycles of a constant current charge at 0.5 CA, a constant voltage charge at 0.05 CA, and a constant current discharge at 0.5 CA under charge cut-off voltage of 4.3 V and discharge cut-off voltage of 2.5 V at 25° C. After the 100 cycles at a constant current charge of 0.2 CA, a constant voltage charge of 0.05 CA, and a constant current discharge of 0.2 CA, discharge capacity was measured and then, divided by the initial discharge capacity, to determine capacity retention after the 100 cycles.

Evaluation Results

The evaluation results of Examples 1 to 14 and Comparative Examples 1 to 8 are shown in Tables 2 and 3.

TABLE 2

| | Composition of negative electrode binder | Content (wt %) AA-AN based copolymer:CMC: particulate dispersed body | Mixing ratio (wt %) water-soluble polymer/negative active material + negative electrode binder | Slurry | | |
|---|---|---|---|---|---|---|
| | | | | Content of solid | Viscosity | Viscosity change |
| Example 1 | Copolymer A + CMC + particulate dispersed body a | 1.1:0.4:1.5 | 1.5 | 52 | 2560 | ○ |
| Example 2 | Copolymer B + CMC + particulate dispersed body a | 1.1:0.4:1.5 | 1.5 | 52 | 2320 | ○ |
| Example 3 | Copolymer A + CMC + particulate dispersed body b | 1.1:0.4:1.5 | 1.5 | 52 | 2580 | ○ |
| Example 4 | Copolymer B + CMC + particulate dispersed body b | 1.1:0.4:1.5 | 1.5 | 52 | 2420 | ○ |
| Example 5 | Copolymer A + particulate dispersed body a | 2.0:1.0 | 2.0 | 58 | 1800 | ○ |
| Example 6 | Copolymer B + particulate dispersed body a | 2.0:1.0 | 2.0 | 58 | 1550 | ○ |
| Example 7 | Copolymer A + particulate dispersed body b | 2.0:1.0 | 2.0 | 58 | 1800 | ○ |
| Example 8 | Copolymer B + particulate dispersed body b | 2.0:1.0 | 2.0 | 58 | 1550 | ○ |
| Example 9 | Copolymer C + CMC + particulate dispersed body a | 1.1:0.4:1.5 | 1.5 | 52 | 3320 | ○ |

TABLE 2-continued

|  | Composition of negative electrode binder | Content (wt %) AA-AN based copolymer:CMC: particulate dispersed body | Mixing ratio (wt %) water-soluble polymer/negative active material + negative electrode binder | Slurry Content of solid | Viscosity | Viscosity change |
|---|---|---|---|---|---|---|
| Example 10 | Copolymer D + CMC + particulate dispersed body a | 1.1:0.4:1.5 | 1.5 | 52 | 2580 | ○ |
| Example 11 | Copolymer E + CMC + particulate dispersed body a | 1.1:0.4:1.5 | 1.5 | 58 | 2120 | ○ |
| Example 12 | Copolymer A + CMC + particulate dispersed body c | 1.1:0.4:1.5 | 1.5 | 52 | 2820 | Δ |
| Example 13 | Copolymer A + CMC + particulate dispersed body d | 1.1:0.4:1.5 | 1.5 | 52 | 2880 | Δ |
| Example 14 | Copolymer A + CMC + particulate dispersed body a | 0.5:0.5:1.6 | 1.0 | 52 | 2520 | ○ |
| Comparative Example 1 | polyacrylic acid homopolymer | 3.0 | 3.0 | 51 | 3000 | ○ |
| Comparative Example 2 | Copolymer A | 3.0 | 3.0 | 54 | 3020 | ○ |
| Comparative Example 3 | Copolymer B | 3.0 | 3.0 | 54 | 3000 | ○ |
| Comparative Example 4 | Copolymer A + CMC | 1.5:1.5 | 3.0 | 45 | 4500 | ○ |
| Comparative Example 5 | Copolymer B + CMC | 1.5:1.5 | 3.0 | 45 | 4380 | ○ |
| Comparative Example 6 | CMC + particulate dispersed body a | 1.5:1.5 | 1.5 | 50 | 3020 | ○ |
| Comparative Example 7 | CMC + particulate dispersed body b | 1.5:1.5 | 1.5 | 50 | 3020 | ○ |
| Comparative Example 8 | polyacrylic acid homopolymer + CMC + particulate dispersed body a | 1.1:0.4:1.5 | 1.5 | 47 | 3060 | ○ |

TABLE 3

|  | Coating suitability | Close-contacting property Before pressing | Close-contacting property After pressing | Expansion rate of negative electrode after first charge (%) | Peeling of negative electrode after first charge | Capacity retention after 100 cycles (%) |
|---|---|---|---|---|---|---|
| Example 1 | ○ | 1.2 | 1.3 | 33.8 | ○ | 85.5 |
| Example 2 | ○ | 1.4 | 1.5 | 33.9 | ○ | 85.1 |
| Example 3 | ○ | 1.5 | 1.7 | 34.1 | ○ | 84.8 |
| Example 4 | ○ | 1.7 | 1.8 | 34.1 | ○ | 84.5 |
| Example 5 | ○ | 1.5 | 1.0 | 34.0 | ○ | 85.2 |
| Example 6 | ○ | 1.5 | 1.2 | 34.2 | ○ | 85.9 |
| Example 7 | ○ | 1.7 | 1.2 | 34.2 | ○ | 85.2 |
| Example 8 | ○ | 1.9 | 1.5 | 34.2 | ○ | 85.1 |
| Example 9 | ○ | 1.1 | 1.1 | 37.8 | Δ | 78.6 |
| Example 10 | ○ | 1.5 | 1.5 | 42.5 | Δ | 77.8 |
| Example 11 | ○ | 1.0 | 1.0 | 38.2 | Δ | 79.0 |
| Example 12 | ○ | 1.0 | 1.1 | 34.7 | Δ | 82.8 |
| Example 13 | ○ | 1.0 | 1.1 | 34.9 | Δ | 82.5 |
| Example 14 | ○ | 0.7 | 1.0 | 35.2 | ○ | 83.5 |
| Comparative Example 1 | X | 0.9 | 0.3 | Negative electrode was not formed | | |
| Comparative Example 2 | X | 1.8 | 0.7 | | | |
| Comparative Example 3 | X | 1.9 | 0.7 | | | |
| Comparative Example 4 | X | 1.0 | 0.4 | | | |
| Comparative Example 5 | X | 1.1 | 0.4 | | | |
| Comparative Example 6 | ○ | 1.2 | 1.4 | 45.0 | X | 75.6 |

TABLE 3-continued

|  | Coating suitability | Close-contacting property | | Expansion rate of negative electrode after first charge (%) | Peeling of negative electrode after first charge | Capacity retention after 100 cycles (%) |
| --- | --- | --- | --- | --- | --- | --- |
|  |  | Before pressing | After pressing |  |  |  |
| Comparative Example 7 | ○ | 1.4 | 1.6 | 46.0 | X | 75.0 |
| Comparative Example 8 | ○ | 1.0 | 1.0 | 45.5 | X | 72.0 |

Consideration on Results of Examples and Comparative Examples

First, as shown in Tables 2 and 3, in Comparative Example 1, which utilized a negative electrode binder made of a polyacrylic acid homopolymer, the negative electrode mixture layer was cracked during the coating/drying process of negative electrode slurry, and thus, failed to provide practically-applicable negative electrodes.

Because the poly acrylic acid has a high modulus of elasticity but low flexibility, sufficient flexibility suitable for a negative electrode mixture layer was not obtained. This is also inferred from the fact that close-contacting property after the pressing was largely deteriorated as shown in Table 3.

In Comparative Examples 2 to 3, which utilized an acrylic acid-acrylonitrile-based copolymer alone as a negative electrode binder, like Comparative Example 1, the negative electrode mixture layers were cracked during the coat/drying process of the negative electrode slurries, and thus, failed to provide practically-applicable negative electrodes.

Likewise, in Comparative Examples 4 and 5, which utilized a water-soluble polymer including an acrylic acid-acrylonitrile-based copolymer and CMC, the problem of generating cracks during the coating/drying process of the negative electrode slurries was not improved.

Referring to Table 3, Comparative Examples 2 to 5 also exhibited that close-contacting property after the pressing was largely deteriorated and accordingly, like Comparative Example 1, Comparative Examples 2 to 5 did not provide sufficient flexibility suitable for a negative electrode mixture layer.

In addition, Comparative Examples 6 to 8, which utilized no acrylic acid-acrylonitrile-based copolymer, as shown in Table 3, exhibited that a negative electrode expansion rate increased to greater than 43% after the first charge, and capacity retention was lower than 76% after 100 cycles.

Referring to these results, the negative electrode slurries according to Comparative Examples 6 to 8 included no acrylic acid-acrylonitrile-based copolymer, and thus, did not sufficiently or suitably suppress or reduce expansion of the negative electrodes, resultantly, deteriorating cycle-life. In addition, in the comparative examples, the negative electrode mixture layers were easily peeled off after the first charge.

On the other hand, in Examples 1 to 14, which are example embodiments of the present disclosure, as shown in Table 3, the aforementioned problem of generating cracks was solved by using a water-soluble polymer including an acrylic acid-acrylonitrile-based copolymer together with a particulate dispersed body and also, limiting a content (or amount) of the water-soluble polymer within a set or predetermined range.

In embodiments of the present disclosure, the flexibility of a negative electrode mixture layer was improved to a practically applicable level by limiting a content (or amount) of the water-soluble polymer including an acrylic acid-acrylonitrile-based copolymer within a set or predetermined range to prepare a negative electrode binder.

On the other hand, Examples 1 to 14 used a content of the water-soluble polymer within a range of 1.0 wt % to 2.0 wt % based on a total mass of 100 wt % of the negative active material and the binder, but the present disclosure is not limited thereto. Indeed, even a content (or amount) of the water-soluble polymer of 0.5 wt % may provide a negative electrode having sufficiently or suitably suppressed or reduced expansion.

In addition, comparing Examples 1 to 14 with Comparative Examples 6 to 8, the negative electrodes of Examples 1 to 14 were sufficiently or suitably suppressed or reduced from expansion during charging and, concurrently, exhibited excellent cycle characteristics, and thereby suppressed or reduced capacity deterioration of the cells according to repeated charge and discharge cycles. In addition, Examples 1 to 14 were suppressed or reduced from peeling of the negative electrode mixture layers after the first charge.

Examples 9 to 14 sufficiently or suitably exhibited the effects of embodiments of the present disclosure, but Examples 1 to 8 exhibited, as shown in Table 3, excellent performance in all items as a rechargeable battery cell.

Referring to the results, each copolymerization ratio of acrylic acid and acrylonitrile in acrylic acid-acrylonitrile-based copolymers and viscosity of an aqueous solution including each acrylic acid-acrylonitrile-based copolymer, viscosity of negative electrode slurry, and the like were designed within a suitable or appropriate range, thereby increasing effects of suppressing or reducing expansion of a negative electrode, improving a cycle-life, and suppressing or reducing peeling of a negative electrode mixture layer.

In addition, when a glass transition temperature of the particulate dispersed body was greater than or equal to about −30° C. and less than or equal to about 20° C., stability of the slurry over time was improved.

In Examples 1 to 14, even though a coat area capacity was 4.9 mAh/cm$^2$, the crack generation was sufficiently or suitably suppressed or reduced, but when the negative electrode slurries of Examples 1 to 14 were used, almost no cracks occurred to an area capacity range of 10 mAh/cm$^2$.

While the subject matter of this disclosure has been described in connection with what is presently considered to be practical example embodiments, it is to be understood that the present disclosure is not limited to the disclosed embodiments. On the contrary, it is intended to cover various suitable modifications and equivalent arrangements included within the spirit and scope of the appended claims.

What is claimed is:

1. A negative electrode slurry, comprising:
a negative active material including a first active material in an amount of greater than or equal to about 5 wt % and less than or equal to about 100 wt % based on 100 wt % of the negative active material,
a binder for binding the negative active material, and
a solvent for dispersing the negative active material and the binder in the negative electrode slurry,
wherein the first active material contains silicon atoms in an amount of greater than or equal to about 20 wt % and less than or equal to about 100 wt % based on 100 wt % of the first active material,
the binder comprises a particulate dispersed body and a water-soluble polymer comprising a copolymer comprising an acrylic acid-based monomer and an acrylonitrile-based monomer, and
when a sum of an amount of the negative active material and an amount of the binder is 100 wt %, an amount of the water-soluble polymer is greater than or equal to about 0.5 wt % and less than or equal to about 2 wt %.

2. The negative electrode slurry of claim 1, wherein the solvent for negative electrode slurry is an aqueous solvent.

3. The negative electrode slurry of claim 1, wherein the first active material comprises at least one active material selected from silicon particulates, silicon-based alloys, and a mixture in which particulates of silicon and/or silicon oxide and graphitic carbon and/or amorphous carbon are combined together.

4. The negative electrode slurry of claim 1, wherein the copolymer comprises a (meth)acrylic acid-based monomer-derived unit in an amount of greater than or equal to about 40 wt % and less than or equal to about 70 wt % based 100 wt % of the copolymer, and a (meth)acrylonitrile-based monomer-derived unit in an amount of greater than or equal to about 30 wt % and less than or equal to about 60 wt % based 100 wt % of the copolymer.

5. The negative electrode slurry of claim 1, wherein the copolymer further comprises a unit derived from an other monomer copolymerizable with the (meth)acrylic acid-based monomer-derived unit and/or the (meth)acrylonitrile-based monomer-derived unit.

6. The negative electrode slurry of claim 1, wherein the water-soluble polymer comprises the copolymer in an amount of greater than or equal to about 50 wt % based on 100 wt % of the water-soluble polymer.

7. The negative electrode slurry of claim 1, wherein the (meth)acrylic acid-based monomer comprises at least one selected from (meth)acrylic acid, a metal salt of (meth)acrylic acid, an ammonium salt of (meth)acrylic acid, and an amine salt of (meth)acrylic acid.

8. The negative electrode slurry of claim 1, wherein an 8 wt % aqueous solution of the acrylic acid-acrylonitrile-based copolymer has a viscosity at 25° C. of greater than or equal to about 500 mPa·s and less than or equal to about 10000 mPa·s.

9. The negative electrode slurry of claim 1, wherein the particulate dispersed body comprises a polymer having a glass transition temperature of greater than or equal to about −30° C. and less than or equal to about 20° C.

10. The negative electrode slurry of claim 1, wherein the particulate dispersed body comprises a copolymer including a styrene monomer-derived unit and a butadiene monomer-derived unit.

11. The negative electrode slurry of claim 1, wherein the water-soluble polymer further comprises a cellulose ether containing a carboxymethyl group and/or a salt of a cellulose ether containing a carboxymethyl group.

12. The negative electrode slurry of claim 1, wherein the negative electrode slurry has a viscosity at a solid content concentration of greater than or equal to about 45 wt % and less than or equal to about 60 wt %, based on 100 wt % of the negative electrode slurry, of greater than or equal to about 1000 mPa·s and less than or equal to about 5000 mPa·s at 25° C.

13. The negative electrode slurry of claim 1, wherein the negative active material further comprises a graphite-based active material as a second active material.

14. The negative electrode slurry of claim 1, which further comprises a conductive agent.

15. A negative electrode comprising solid components of the negative electrode slurry of claim 1.

16. The negative electrode of claim 15, wherein an area capacity of the negative electrode is greater than or equal to about 3.5 mAh/cm$^2$ and less than or equal to about 10 mAh/cm$^2$.

17. A rechargeable battery comprising the negative electrode of claim 15.

* * * * *

UNITED STATES PATENT AND TRADEMARK OFFICE
CERTIFICATE OF CORRECTION

| | | |
|---|---|---|
| PATENT NO. | : 11,824,196 B2 | Page 1 of 1 |
| APPLICATION NO. | : 17/450651 | |
| DATED | : November 21, 2023 | |
| INVENTOR(S) | : Tomoyuki Fukatani et al. | |

It is certified that error appears in the above-identified patent and that said Letters Patent is hereby corrected as shown below:

In the Claims

In Column 27, Line 33, in Claim 4, after "based" insert -- on --.

In Column 27, Line 38, in Claim 4, after "based" insert -- on --.

Signed and Sealed this
Twentieth Day of February, 2024

*Katherine Kelly Vidal*

Katherine Kelly Vidal
*Director of the United States Patent and Trademark Office*